J. B. ROWE AND A. G. BARRATT.
CHANGE SPEED GEARING.
APPLICATION FILED JUNE 16, 1920.
1,400,317.
Patented Dec. 13, 1921.
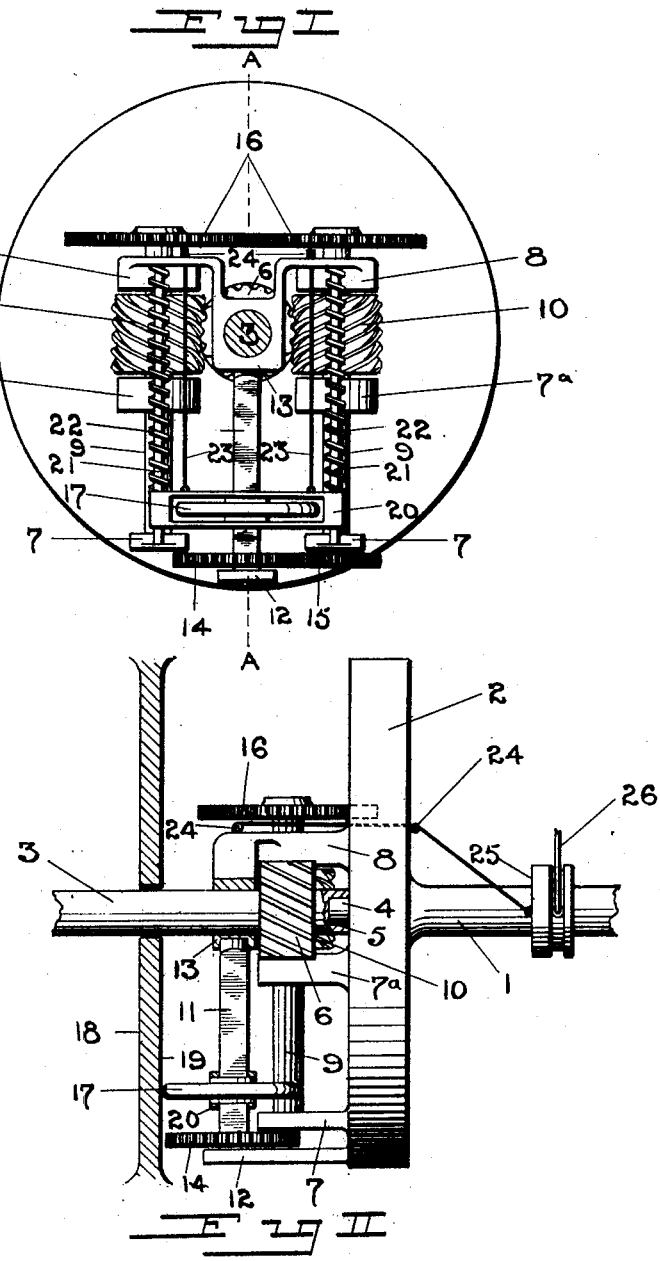
INVENTORS
JOHN B. ROWE
ARTHUR G. BARRATT
BY
ATTORNEYS

UNITED STATES PATENT OFFICE.

JOHN BOYNE ROWE AND ARTHUR GARFIELD BARRATT, OF JOHANNESBURG, TRANSVAAL, SOUTH AFRICA.

CHANGE-SPEED GEARING.

1,400,317. Specification of Letters Patent. Patented Dec. 13, 1921.

Application filed June 16, 1920. Serial No. 389,427.

*To all whom it may concern:*

Be it known that we, JOHN BOYNE ROWE, a British subject, residing at 59 Millbourne road, Judith Paarl, Johannesburg, Transvaal Province, and ARTHUR GARFIELD BARRATT, a British subject, residing at 3 Northampton Buildings, Bree street, Johannesburg, Transvaal Province, of the Union of South Africa, have invented certain new and useful Improvements in Change-Speed Gearing, of which the following is a specification.

The present invention relates to speed gearing in which the gear ratio is made continuously variable by means of an auxiliary variable friction gear.

The purpose of the invention is to provide a simple mechanism of this character in which the moving parts are subjected to comparatively little stress and will accordingly wear well.

The invention is illustrated in the accompanying drawings in which—

Figure I is a longitudinal view partly in section.

Fig. II an end view sectioned through A—A Fig. I.

1 indicates a driving shaft provided with a fly wheel 2 or like part on which the gear is mounted. 3 is the driven shaft, the speed of which is to be varied in relation to the speed of the shaft 1. The shaft 3 is shown as centered with the shaft 1 by a spigot 4 on the shaft 1 entering a bearing socket 5 in the end of shaft 3. Rigid with the shaft 3 is a worm wheel 6, and mounted in bearings 7, 7ᵃ, 8, on the fly wheel are one or more spindles 9, each rigidly carrying a worm 10 which gears with the worm wheel 6.

The drive is effected by the worms 10 acting as solid dogs to rotate the worm wheel 6 by direct tangential thrust. The angular pitch of the worms, however, is such that, assuming them to be free to rotate on their own axes, they can substantially be so rotated by the resisting thrust of the worm wheel 6. For instance it can be arranged that such thrust could just rotate them; but preferably the pitch is made sufficiently short that the worm could almost, but not quite, slip. The worms are caused or allowed thus to slip at a variable and controlled rate, whereby the wheel 6 is allowed to lag relatively to the shaft 1 and so reduce the speed of shaft 3.

For the purpose of rotating the spindles 9, a shaft 11 extends radially from the axis of the shafts 1, 3 and is rotatably mounted in bearings 12, 13, on the fly wheel 2. The bearing 13 is in the form of a bridge extending from the bearings 8. It also provides an outer bearing $xx$ for the worm wheel 6. Said shaft 11 is in driving engagement with one of the spindles 9 by gear wheels 14, 15. The second spindle 9 is driven from its fellow by equal gear wheels 16.

A friction wheel 17 is splined on said shaft 11 so as to rotate therewith, but to be free to slide longitudinally thereon. Said friction wheel runs on a fixed part 18 providing a surface 19 transverse to the axis of the shafts 1 and 3. The friction wheel 17 is mounted in a carriage 20 which is guided on rods 21 fixed to the bearings 7 and 8. Springs 22 on said rods 21 tend constantly to thrust the carriage 20 away from the axis of the shafts 1, 3. Flexible wires 23 are attached to said carriage 20 and are carried over pulleys 24 and through the fly wheel 2 to a sleeve 25 sliding on the shaft 1. The position of said sleeve 25 and accordingly the radial position of the carriage 20 and friction wheel 17 is controlled by, for instance, a hand lever 26.

When the wheel 17 is at its nearest point to the axis of the shaft 3, the rotational movement of the worms 10 is relatively slow and shaft 3 is driven at its maximum speed. As the wheel 17 is moved further outward, the speed of the worms 10, and the retardation of the shaft 3 increases; until with a given radial distance of the wheel 17, depending upon the diameter of the worm wheel 6, the diameter of the wheel 17 and the ratio of the gearing 14, 15, no motion is transmitted to the shaft 3. This is the position of neutral gear.

It will be seen that in the operation above described the function of the friction wheel 17 is simply to determine the slipping of the worms 10 over the worm wheel 6 which nearly occurs without the worm driving mechanism. The amount of power transmitted through the wheel 11 need, therefore be very small.

If desired, the wheel 17 may be moved outwardly beyond the point of neutral gear, when the motion of the shaft 3 is reversed. In this case, however, the wheel 17 has to transmit the whole of the power to the shaft 3.

We claim—

1. A change speed gearing comprising a driving shaft, a driven shaft, a worm wheel fast on the driven shaft, a worm shaft and a friction wheel shaft geared together arranged at right angles to the driving shaft in bearings carried thereby, a worm on the worm shaft in gear with the said worm wheel, the pitch of the worm being such that when unrestrained it will be rotated idly as it is carried around the worm wheel by rotation of the driving shaft, a friction wheel mounted on the said friction wheel shaft, and a stationary surface arranged to provide a path on which the said friction wheel can roll.

2. A change speed gearing comprising a driving shaft, a driven shaft, a worm wheel fast on the driven shaft, a worm shaft, and a friction wheel shaft geared together arranged at right angles to the driving shaft in bearings carried thereby, a worm on the worm shaft in gear with the said worm wheel, the pitch of the worm being such that when unrestrained it will be rotated idly as it is carried around the worm wheel by rotation of the driving shaft, a friction wheel mounted on the said friction wheel shaft, a stationary surface arranged to provide a path on which the said friction wheel can roll, a carriage in which the said friction wheel is mounted, guides for the said carriage, and springs urging the carriage in one direction along the said guides.

3. A change speed gearing comprising a driving shaft, a driven shaft, a worm wheel fast in the driven shaft, a worm shaft, and a friction wheel shaft geared together arranged at right angles to the driving shaft in bearings carried thereby, a worm on the worm shaft in gear with the said worm wheel, the pitch of the worm being such that when unrestrained it will be rotated idly as it is carried around the worm wheel by rotation of the driving shaft, a friction wheel mounted on the said friction wheel shaft, a stationary surface arranged to provide a path on which the said friction wheel can roll, a carriage in which the said friction wheel is mounted, guides for the said carriage, springs urging the carriage in one direction along the said guides and flexible wires whereby the said carriage can be moved against the thrust of the said springs.

In testimony whereof we affix our signatures.

JOHN BOYNE ROWE.
ARTHUR GARFIELD BARRATT.